United States Patent Office 2,921,863
Patented Jan. 19, 1960

2,921,863
SETTLING OF LUMINESCENT SCREENS

Elmer E. Selby, Jr., Elmira, N.Y., Wendell L. Plummer, Richardson, Tex., and Ernest A. Lederer, Essex Fells, N.J., assignors to Westinghouse Electric Corporation, East Pittsburgh, Pa., a corporation of Pennsylvania No Drawing. Application August 27, 1958
Serial No. 757,461

2 Claims. (Cl. 117—33.5)

This invention relates to a process of depositing luminescent material on a solid surface in order to form a luminescent screen and, more particularly, to a settling process for formation of a luminescent screen suitable for use in an image display device such as a cathode ray tube.

In the formation of luminescent screens the luminescent phosphor material must be applied uniformly to a desired surface and it must also have adequate adhesion to that surface. The method which is currently used to a large extent in industry in the formation of luminescent screens, particularly in the formation of luminescent screens in cathode ray tubes, involves settling a phosphor material from a settling liquid. The settling liquid ordinarily includes a binder material and a so-called "electrolyte" which permits rapid settling of the phosphor onto the desired surface and also aids in providing certain amount of adhesion of phosphor to the surface. However, with the large number of cathode ray tubes being made in industry at present, it is very desirable to have a settling process which is as rapid as possible and yet provides a luminescent screen with good adhesion.

A process which is used at present involves a binder material of a suitable silicate such as potassium or sodium silicate, usually in a water solution, and the use of an electrolyte such as barium acetate. The phosphor particles settle to the face of the cathode ray tube and are held in place as a result of the presence of the sodium or potassium silicate. The electrolyte shortens the process and decreases the time required before the unused settling liquid may be removed without disturbing the luminescent screen. While barium acetate as an electrolyte provides a screen with adequate adhesion in some instances, it is very desirable to improve the screen adhesion, thereby reducing the settling time and/or the "shrinkage" (the number of defective screens and therefore defective cathode ray tubes formed). We have found that the use of an electrolyte made of a mixture of strontium acetate with a very small amount of barium acetate provides screens with superior adhesion. In fact, we have found that the amount of shrinkage is decreased at least 10% by the use of this electrolyte which, as can be seen, is extremely important in the highly competitive cathode ray tube industry.

The theory of how this particular electrolyte results in this increase in screen adhesion and decrease in shrinkage is not entirely understood. In general, it is known that when phosphor particles are dispersed in a solution such as water and, in this case, potassium silicate, there is formed what is known as an electrical double layer in the dispersion medium surrounding each phosphor particle. The electrical double layer results in a potential which is known as the zeta potential. Also, the glass surface onto which it is desired to settle the luminescent material acquires a zeta potential. Both the phosphor particles and the glass surface in effect are negatively charged, and, therefore, there is an electrical repulsion between them which prevents proper settling. This electrical repulsion may be expressed in terms of the zeta potential of glass surface multiplied by the zeta potential of the phosphor surface. We assume that when an electrolyte such as strontium acetate, with a small amount of barium acetate, is utilized, the zeta potential of both the phosphor particle surface and the glass surface is decreased with a consequent decrease in the repulsion between the two surfaces.

The electrolyte also has another function of aiding in the polymerization of the silicate ions which have been adsorbed on the glass surface and on the surface of the phosphor particles. This polymerization takes place preferentially at the solid surface because the silicate ions are concentrated by the adsorption at the solid interface. It is thought that the electrolyte molecules and ions crowd into the electrical double layer between the particles and thereby reduce the repulsion between the silicate ions. Also, it is thought that the electrolyte enters into a chemical reaction with the potassium or sodium silicate to form strontium and barium silicate compounds which act as a binder for the phosphor material and provide excellent adhesion.

Therefore, it is an object of this invention to provide an improved luminescent screen.

It is another object of this invention to provide an improved luminescent screen with improved adhesion properties.

It is another object to provide an improved luminescent screen which decreases the amount of defective cathode ray tubes manufactured.

These and other objects of this invention will be apparent from the following description.

One particular embodiment of our invention, suitable for use in the manufacture of a typical 90° 21" cathode ray tube, will be described. The washed and still wet cathode ray tube bulb is placed on a belt so that the settling surface or face plate is on the bottom. In the bulb is placed about 1800 milliliters of a 5.0 gram per liter solution of a mixture of strontium acetate and barium acetate in deionized or distilled water. In this particular embodiment the strontium acetate may be 99.95% and the barium acetate may be 0.05% of the mixture. Additional deionized or distilled water is added to bring the level of the liquid in the bulb to a height of approximately 5½ inches. It is found that approximately 18.31 liters of water are required for this depth. When this electrolyte solution has become quiescent, a dispensing nozzle is lowered into the bulb and a settling solution is added. The settling solution may consist of a mixture of a phosphor slurry, potassium silicate and deionized water and is sprayed onto the surface of the electrolyte solution. The phosphor slurry is present in the amount of approximately 296 milliliters of a phosphor suspension in water which includes 20.0±1.0 milligrams of phosphor per milliliter of suspension. The settling solution also includes about 990 milliliters of potassium silicate solution having approximately 14.5% solids with a specific gravity of, about from 1.120 to 1.134 at 80° F. In this potassium silicate solution, there is a mol ratio of $SiO_2$ to $K_2O$ of 3.30.

Next there are two deionized or distilled water rinses of about 1200 milliliters and 600 milliliters, respectively, to flush any remaining phosphor or potassium silicate from the dispensing apparatus. The total volume of liquid in the bulb is then approximately 22.9 liters. This solution is allowed to settle for approximately 20 minutes during which time the phosphor particles settle on the settling surface of the bulb and become bound to the glass and to each other by the interaction between the strontium acetate and barium acetate and the potassium silicate. The large difference in temperature between the liquid in the bulb (about 55 to 65° F.) and the ambient temperature (80° F.) produces convection currents in the liquid which aid in obtaining a uniform phosphor deposit.

Following the 20-minute settling time the liquid is partially removed from the bulb by a suitable method such as may be done partially by a syphon with the remainder of the liquid being decanted. The phosphor screen is then dried by forced air current of approximately 425 cubic feet per hour. After this, the standard manufacturing operations may take place such as rewetting with deionized water, inspection by transmitted white light, organic filming, aluminizing, etc.

The specific amounts mentioned in the above illustration give excellent results, but we have found that they may be varied within certain limits. The amount of strontium acetate may vary between 90% and 99.999% by weight of the solid electrolyte with the amount of barium acetate therefore varying between the amount of 10% and 0.001%. Within these limits it is found that a phosphor screen of excellent adhesion is formed. The amount of solid electrolyte per liter of total settling solution may vary between about 0.4 and 0.6 gram.

When potassium silicate or sodium silicate are referred to in the subject application, various mixtures of potassium or sodium oxides and silicon oxides are, of course, included. The concentration of silicate solids in the settling solution may also vary between about 0.4% and 1.0% with satisfactory results.

Also, of course, the process is not limited to any particular phosphor material and may be used for example with zinc sulphide phosphors, zinc sulphide, zinc cadmium sulphide phosphors, zinc silicate phosphors, magnesium silicate phosphors, zinc beryllium silicate phosphors, zinc oxide phosphors and others.

Of course, the electrolyte, the phosphor slurry and the silicate solution may be mixed in different order separately or together and still provide luminescent screens which may be suitable for certain purposes. Also, it is usually desirable to pretreat the glass surface upon which the luminescent screen is to be formed by a wash with a dilute acid such as hydrofluoric acid, hydrochloric acid or sulphuric acid, which tends to reduce the repulsion between the glass surface and the phosphor particles during the settling process.

While the present invention has been described in a few forms only, it will be obvious to those skilled in the art that it is not so limited but is susceptible of various changes and modifications without departing from the spirit and scope thereof.

We claim as our invention:

1. The process of forming a luminescent screen, said process including placing the following materials in a settling container having a settling surface, (1) an aqueous solution of a mixture of from 90 to 99.999% strontium acetate and from 10 to 0.001% barium acetate, (2) a silicate solution selected from the group consisting of sodium silicate and potassium silicate, and (3) a luminescent phosphor material; settling said phosphor material onto said settling surface, and removing the excess solution from said settling container.

2. A luminescent screen formed by the process of claim 1.

References Cited in the file of this patent

UNITED STATES PATENTS

| | | |
|---|---|---|
| 2,346,553 | Brown | Apr. 11, 1944 |
| 2,451,590 | Tidik | Oct. 19, 1948 |
| 2,684,306 | Brewer et al. | July 20, 1954 |
| 2,733,163 | Steadman | Jan. 31, 1956 |
| 2,772,241 | Ranby | Nov. 27, 1956 |
| 2,830,027 | Schweitzer | Apr. 8, 1958 |